United States Patent [19]
Juma

[11] Patent Number: 5,840,433
[45] Date of Patent: Nov. 24, 1998

[54] COATING COMPOSITIONS FOR ARTICLES OF GRAPHITE-ALUMINA REFRACTORY MATERIAL

[75] Inventor: Kassum Juma, Stafford, England

[73] Assignee: Foseco International Limited, Birmingham, England

[21] Appl. No.: 617,842

[22] PCT Filed: Sep. 30, 1994

[86] PCT No.: PCT/GB94/02127

§ 371 Date: Mar. 13, 1996

§ 102(e) Date: Mar. 13, 1996

[87] PCT Pub. No.: WO95/11870

PCT Pub. Date: Mar. 4, 1995

[30] Foreign Application Priority Data

Oct. 27, 1993 [GB] United Kingdom ............ 9322154

[51] Int. Cl.$^6$ ........................................ B32B 9/00
[52] U.S. Cl. ............... 428/689; 428/34.4; 428/34.6; 428/323; 428/384; 428/403; 428/408; 428/446; 428/469; 428/472; 428/699; 428/701; 428/702; 427/443.2; 106/38.35; 501/95; 501/100; 501/133
[58] Field of Search .................... 428/446, 689, 428/699, 469, 408, 403, 34.4, 34.6, 384, 323, 328, 368, 432, 433, 457, 472, 701, 702; 427/443.2; 106/38.35, 38.3; 501/133, 95, 109, 94, 88, 100

[56] References Cited

U.S. PATENT DOCUMENTS

| | | | |
|---|---|---|---|
| 4,041,199 | 8/1977 | Cartwright | 428/36 |
| 4,304,605 | 12/1981 | Keibler | |
| 4,951,852 | 8/1990 | Rancoulle | 428/689 |

FOREIGN PATENT DOCUMENTS

| | | |
|---|---|---|
| 1301780 | 5/1992 | Canada . |
| 0296981 | 12/1988 | France . |
| 57-039121 | 3/1982 | Japan . |
| 60-238080 | 11/1985 | Japan . |
| 876249 | 2/1980 | U.S.S.R. . |
| 1268128 | 3/1972 | United Kingdom . |
| 2100744 | 1/1983 | United Kingdom . |

*Primary Examiner*—William Krynski
*Assistant Examiner*—Abraham Bahta
*Attorney, Agent, or Firm*—Nixon & Vanderhye P.C.

[57] ABSTRACT

A refractory article of manufacture comprises an article of graphite-alumina refractory material coated with at least one mineral having a sheet structure and a refractory oxide bond. The coating protects the article against thermal shock. A typical mineral having a sheet structure may be talc, a mica, vermiculite, antigorite, kaolinite, montmorillonite, pyrophyllite, or combinations of these materials. A typical refractory oxide bond is formed from alumina gel, silica sol, alumina sol, zirconia sol, or combinations of these materials (such as a combination of alumina gel and cationic silica sol). The coating may also contain a minor proportion of fibrous material and a minor proportion of particulate refractory filler other than the mineral having a sheet structure, and a portion of the mineral content of the mineral forming the sheet structure may include graphite. The coating may be in the form of a fluid having 5–50% by weight of mineral having a street structure, 20–60% by weight of refractory oxide binder for forming the refractory oxide bond, and 20–50% by weight of carrier liquid. The carrier liquid is removed by drying (e.g. in an oven).

20 Claims, No Drawings

COATING COMPOSITIONS FOR ARTICLES OF GRAPHITE-ALUMINA REFRACTORY MATERIAL

CROSS-REFERENCE TO RELATED APPLICATION

This is a U.S. national phase of PCT/GB94/02127 filed Sep. 30, 1994.

BACKGROUND AND SUMMARY OF THE INVENTION

This invention relates to coated articles made from graphite-alumina refractory material and which are used, for example, as nozzles or shrouds in the casting of metals, especially steel.

Articles such as pouring nozzles for molten metal-containing vessels, e.g. ladles and tundishes, and shrouds which surround the metal stream flowing from one vessel to another, e.g. a ladle to a tundish, are commonly made in a graphite-alumina refractory material having a carbon bond produced by the decomposition of a phenolic resin binder.

Such a material has poor thermal shock resistance and tends to crack so it is necessary to treat nozzles and shrouds in some way so as to minimise the thermal shock produced when they are heated rapidly to elevated temperatures.

One method of treatment which is commonly used is to subject the article to a decarburisation treatment prior to use. The article is heated in an oxidising atmosphere so as to oxidise or burn out carbon at the surface of the article and leave a surface layer of porous, essentially unbonded alumina.

In the case of nozzles, another practice is to apply a ceramic fibre-containing insulating paper around the outside of the nozzle. However, this practice is expensive and time-consuming as it is necessary to cut the paper sheet and wrap and wire it in order to fit it properly around the nozzle.

It has also been proposed to coat nozzles with an insulating coating and Canadian Patent No. 1301780 describes the use of a coating composition comprising about 30% to about 85% by weight of a finely divided constituent selected from one or more of fused silica grains, alumina powder, zirconia powder, mullite powder and alumina bubbles; 0 to about 10% by weight of ceramic fibre selected from aluminosilicate fibre, zirconia fibre, titania fibre, alumina-chrome fibre, alumina bubbles and zirconia bubbles; about 15% to about 30% by weight water; 0 to about 7% by weight of a binder constituent selected from Glass H, sodium silicate and acrylic resins; and 0 to about 40% by weight of a glass forming frit material.

GB-A-2 100744 describes a composition which is useful as a heat-resistant coating material on the surface of a metal or ceramic article and which contains a refractory oxide powder such as alumina or silica, an inorganic powder having cation-exchangeability and a layered structure, such as mica, and an alkali metal silicate or aluminate as binder.

JP-A-60238080 describes a heat-resistant coating for use on the inner surface of ladles for molten metals and particularly for ladles for molten aluminium. The coating contains refractory aggregate which is mixed with zirconia, titania and kaolinite, and a binder consisting of colloidal silica, sodium silicate and potassium silicate.

SU-A-876249 describes an aqueous suspension for use in making lost wax or investment casting moulds. The suspension contains 30 to 40% by weight of water glass, 5 to 40% by weight of mica and a balance of refractory filler such as quartz dust.

GB-A-1268128 describes an aqueous coating composition for protecting metal or refractory surfaces, particularly ingot mould bottom plates, against attack or erosion by molten metals. The composition contains siliceous and carbonaceous refractory materials, sodium silicate and a polysaccharide gum and, optionally, a clay such as montmorillonite.

It has now been found that a coating containing one or more minerals having a sheet structure and bonded with a refractory oxide is particularly satisfactory for protecting graphite-alumina articles such as nozzles and shrouds against thermal shock.

DETAILED DESCRIPTION

According to the invention there is provided an article of graphite-alumina refractory material having a coating thereon comprising one or more minerals having a sheet structure and a refractory oxide bond.

Suitable minerals having a sheet structure include talc, micas, vermiculite, antigorite (lamellar serpentine) and clays such as kaolinite, montmorillonite and pyrophyllite. Graphite may also be used but only in combination with one or more other minerals.

Suitable refractory oxide binders include alumina gel (which may be formed from alpha alumina monohydrate and a gelling agent such as aluminium chloride or aluminium nitrates) and colloidal oxide sols such as silica sol, alumina sol and zirconia sol. A combination of alumina gel and a cationic silica sol is preferred.

For convenience and reasons of cost, the carrier liquid is preferably water but if desired, an organic carrier such as an alcohol could also be used.

The coating composition will usually contain 5–50% by weight of mineral having a sheet structure, 20–60% by weight of refractory oxide binder and 20–50% by weight carrier liquid.

The coating composition may be applied to the refractory article by any one of a variety of methods, for example, by spraying, by brushing, by dipping the article into the composition or by overpouring.

The amount of carrier liquid present will be dependent partly on the chosen method of application and partly on the particular mineral or minerals used and on the particular refractory oxide binder.

After application, the coating composition is dried to remove the carrier liquid, for example, in an oven.

The coating composition may also contain other constituents such as wetting agents, anti-foaming agents or thickening agents to improve the rheoiogical and application characteristics of the composition.

The coating composition may also contain a minor proportion of a fibrous material such as aluminosilicate fibre in order to improve the strength of the coating after application and drying so as to allow coated nozzies or shrouds etc. to be transported before use without the coating becoming damaged.

The coating composition may also contain a minor proportion of a particulate refractory filler other than a mineral having a sheet structure or a refractory oxide binder. However, refractory fillers such as zirconia, zircon or alumina will tend to reduce the porosity and heat-insulating properly of the coating.

When applied to graphite-alumina refractory articles the coating compositions of the invention produce porous, heat-insulating coatings which protect the articles from thermal shock when they are heated rapidly to elevated temperatures and which in use in contact with a molten metal such as steel, are sacrificial in that they are washed away by the molten metal once they have served their purpose.

The following examples will serve to illustrate the invention:

EXAMPLE 1

|  | % by weight |
|---|---|
| (1) | |
| Talc | 13.3 |
| Mica | 17.7 |
| Expanded vermiculite | 8.9 |
| Alumina monohydrate | 4.4 |
| Aluminium chloride | 1.3 |
| Cationic colloidal silica | 2.7 |
| Aluminosilicate fibre | 2.7 |
| Wetting agent | 0.2 |
| Water | 48.8 |
| (2) | |
| Molochite | 50.0 |
| Bubble alumina | 21.0 |
| Attapulgite clay | 4.0 |
| Polyacrylate binder | 4.0 |
| Antifoam | 0.25 |
| Wetting agent (sodium phosphate) | 0.25 |
| Water | 20.5 |
| (3) | |
| Graphite | 65.0 |
| Alumina monohydrate | 9.0 |
| Aluminium chloride | 1.0 |
| Water | 25.0 |

(4) Proprietary glaze (available from Bayer) normally used as an antioxidation coating on graphite-containing articles and consisting of silicon and silicon carbide in a sodium borate glass.

(1) is a coating composition according to the invention. (2), (3) and (4) are not according to the invention and were tested for the purpose of comparison.

Solid cylindrical rods 5 cm in diameter and 20 cm long were produced by isostatic pressing from a mixture of 70% by weight alumina and 30% by weight graphite and a phenolic resin binder. After pressing, the rods were heated at 950° C. for 30 minutes to cure and carbonise the resin to produce a carbon—carbon bond.

A central hole was drilled in one end of each of the rods to a standard depth, the outside of the rods was coated with the coating compositions to a thickness of 3–4 mm and the coated rods were heated at 110° C. for 2 hours to dry the coatings.

A thermocouple was inserted in the hole, the coated rod was immersed in molten steel at 1600° C. and the temperature was recorded at 10 second intervals over a period of 3 minutes, and the rate of heating was calculated.

The results obtained are shown in the table below.

| COATING COMPOSITION | RATE OF HEATING °C./SECOND |
|---|---|
| (1) | 6.68 |
| (2) | 8.57 |
| (3) | 9.38 |
| (4) | 8.93 |

The results show that coating composition (1) significantly reduced the thermal-conductivity of the alumina/graphite rod material and, hence, improved its thermal shock resistance compared with the other three compositions. The rate of heating of the rod coated with the graphite-based coating composition (3) differed very little from that of an uncoated rod of the same material.

EXAMPLE 2

In a further Lest a test rod of the type used in Example 1 and coated with coating composition (1) was compared with an uncoated rod by heating the rods to a temperature of 1200° C. over a period of 1 minute and measuring the temperature at intervals of 1 minute as the rods cooled to 600° C.

The uncoated rod cooled to 600° C. in only 8 minutes whereas the coated rod took 12 minutes to reach the same temperature, thus demonstrating the heat-insulating characteristics of the coating.

EXAMPLE 3

The following are examples of two further coating compositions according to the invention for coating the external surface of tundish to mould nozzles for continuous casting equipment:

|  | % by weight |
|---|---|
| (5) | |
| Pyrophillite | 37.2 |
| Alumina monohydrate | 4.6 |
| Aluminium nitrate | 1.1 |
| Cationic colloidal silica | 3.8 |
| Expanded vermiculite | 7.0 |
| Wetting agent | 0.3 |
| Water | 46.0 |
| (6) | |
| Pyrophillite | 49.5 |
| Alumina monohydrate | 5.0 |
| Aluminium nitrate | 1.2 |
| Cationic colloidal silica | 4.0 |
| Wetting agent | 0.3 |
| Water | 40.0 |

I claim:

1. A refractory article of manufacture comprising:
an article of graphite-alumina refractory material coated with at least one mineral having a sheet structure and a refractory oxide bond.

2. An article as recited in claim 1 wherein said at least one mineral having a sheet structure comprises talc, a mica, vermiculite, antigorite, kaolinite, montmorillonite, pyrophyllite, or a combination thereof.

3. An article as recited in claim 2 wherein said at least one mineral includes at least some graphite.

4. An article as recited in claim 2 wherein said refractory oxide bond is formed from alumina gel, silica sol, alumina sol, zirconia sol, or a combination thereof.

5. An article as recited in claim 4 wherein said refractory oxide bond is formed from a combination of alumina gel and cationic silica sol.

6. An article as recited in claim 5 wherein said coating also includes a minor proportion of a fibrous material.

7. An article as recited in claim 6 wherein said coating also comprises a minor proportion of a particulate refractory material other than said at least one mineral having a sheet structure.

8. An article as recited in claim 1 wherein said coating comprises a composition that is applied to said article and then dried to remove carrier liquid, said composition comprising, when applied, 5–50% by weight of said at least one mineral having a sheet structure, 20–60% by weight of a refractory oxide binder forming said refractory oxide bond, and 20–50% by weight of carrier liquid.

9. An article as recited in claim 1 wherein said at least one mineral includes at least some graphite.

10. An article as recited in claim 1 wherein said refractory oxide bond is formed from alumina gel, silica sol, alumina sol, zirconia sol, or a combination thereof.

11. An article as recited in claim 1 wherein said refractory oxide bond is formed from a combination of alumina gel and cationic silica sol.

12. An article as recited in claim 1 wherein said coating also includes a minor proportion of a fibrous material.

13. An article as recited in claim 1 wherein said coating also comprises a minor proportion of a particulate refractory material other than said at least one mineral having a sheet structure.

14. An article as recited in claim 3 wherein said refractory oxide bond is formed from alumina gel, silica sol, alumina sol, zirconia sol, or a combination thereof.

15. An article as recited in claim 2 wherein said coating also includes a minor proportion of a fibrous material.

16. An article as recited in claim 2 wherein said coating also comprises a minor proportion of a particulate refractory material other than said at least one mineral having a sheet structure.

17. An article as recited in claim 10 wherein said coating also includes a minor proportion of a fibrous material.

18. An article as recited in claim 10 wherein said coating also comprises a minor proportion of a particulate refractory material other than said at least one mineral having a sheet structure.

19. A method of manufacturing a refractory article comprising the step of: (a) coating a graphite-alumina refractory material article with at least one mineral having a sheet structure and a refractory oxide bond.

20. A method as recited in claim 19 wherein step (a) is practiced by applying a fluid composition comprising 5–50% by weight of the at least one mineral having a sheet structure, 20–60% by weight of a refractory oxide binder for forming the refractory oxide bond, and 20–50% by weight of carrier liquid; and drying the coating composition to remove the carrier liquid.

* * * * *